(12) United States Patent
Toth et al.

(10) Patent No.: US 7,258,006 B2
(45) Date of Patent: Aug. 21, 2007

(54) SIGHT GAUGE SHIELD AND METHOD

(75) Inventors: Timothy J. Toth, Aurora, OH (US); Raymond P. Kawolics, Solon, OH (US)

(73) Assignee: The Meyer Company, Cleveland, OH (US)

( * ) Notice: Subject to any disclaimer, the term of this patent is extended or adjusted under 35 U.S.C. 154(b) by 254 days.

(21) Appl. No.: 10/730,699

(22) Filed: Dec. 8, 2003

(65) Prior Publication Data

US 2004/0118866 A1   Jun. 24, 2004

Related U.S. Application Data

(60) Provisional application No. 60/432,057, filed on Dec. 9, 2002.

(51) Int. Cl.
*G01F 23/02*   (2006.01)

(52) U.S. Cl. .......................................... 73/325; 222/23

(58) Field of Classification Search ................. 73/325; 222/23

See application file for complete search history.

(56) References Cited

U.S. PATENT DOCUMENTS

| | | | | |
|---|---|---|---|---|
| 535,449 A | * | 3/1895 | Lunken | 73/325 |
| 955,175 A | * | 4/1910 | Lomax | 73/325 |
| 1,032,766 A | * | 7/1912 | Paul | 73/326 |
| 1,157,805 A | * | 10/1915 | Ray | 126/378.1 |
| 1,164,484 A | * | 12/1915 | Ernst | 73/326 |
| 1,349,236 A | * | 8/1920 | Strohbach | 99/285 |
| 1,702,447 A | * | 2/1929 | McBrayer | 73/325 |
| 3,358,510 A | * | 12/1967 | Hoffmann et al. | 73/329 |
| 4,345,468 A | * | 8/1982 | Jackson | 73/326 |
| 5,645,011 A | * | 7/1997 | Winkler et al. | 116/264 |
| 6,282,952 B1 | | 9/2001 | Kawolics | 73/325 |
| 6,528,560 B2 | * | 3/2003 | Buhler | 524/123 |
| 7,000,468 B2 | * | 2/2006 | Doorhy et al. | 73/301 |

\* cited by examiner

*Primary Examiner*—Michael Cygan
(74) *Attorney, Agent, or Firm*—Fay Sharpe LLP (57) ABSTRACT

A one-piece molded polymeric sight gauge shield with internal cylindrical bore and method for making same are disclosed, along with a liquid-containing urn including same. The shield is molded by mating first and second mold portions about first and second spaced-apart cores to define: (i) a first annular void about the first core; and, (ii) a second annular void about the second core. The first and second mold portions respectively comprise first and second stand-up portions that first and second sidewall voids between themselves and the mating mold portion. First and second end portions of a gauge shield member are molded by filling the first and second voids, while the first and second sidewalls of the gauge shield member are molded by filling the first and second sidewall voids. The molding operation is a single-axis straight-pull molding method.

11 Claims, 6 Drawing Sheets

SIGHT GAUGE SHIELD AND METHOD

CROSS-REFERENCE TO RELATED APPLICATIONS

This application claims priority from and benefit of the filing date of U.S. provisional application Ser. No. 60/432,057 filed Dec. 9, 2002.

BACKGROUND

The present invention relates to shields for sight gauges. It finds particular application in connection with the protection of sight gauges used in association with urns containing coffee or other liquids that are to be dispensed through an associated faucet.

Sight gauges for urns and the like are used to indicate the level of liquid in the urn and are provided in the form of an elongated tubular glass or polymeric member in fluid communication with the urn and secured adjacent an outer wall thereof and/or to the dispensing faucet thereof in a vertical orientation for convenient operator viewing. The tubular member is surrounded by a protective metal or plastic gauge shield that supports the tubular member and protects same against breakage during use and during shipping/handling of the urn.

To permit viewing of the tubular gauge member, prior gauge shields have included at least one slot formed through a wall thereof. The slot is formed by milling or is defined by a die during an extrusion process if the gauge shield is an extruded member. Known milled sight gauge shields have been deemed suboptimal in terms of cost for certain applications. Other lower-cost shields, e.g., extruded polymeric gauge shields, have been found to lack the desired aesthetics in that they do not resemble traditional milled shields.

It has been deemed desirable to provide a molded polymeric sight gauge shield that exhibits the desired aesthetics and performance characteristics with associated low-cost.

SUMMARY

In accordance with a first aspect of the present development, a method for manufacturing a sight gauge shield comprises mating first and second mold portions about first and second spaced-apart cores to define: (i) a first annular void between the first core and the first and second mold portions; and, (ii) a second annular void between the second core and the first and second mold portions. The first and second mold portions respectively comprise first and second stand-up portions, wherein the first stand-up portion cooperates with said second mold portion to define a first sidewall void and the second stand-up portion cooperates with the first mold portion to define a second sidewall void. Opposite first and second end portions of a gauge shield member are molded by filling the first and second annular voids with a polymeric material. First and second sidewalls of the gauge shield member are molded as a one-piece construction with the first and second annular portions by filling the first and second sidewall voids with the polymeric material.

In accordance with another aspect of the present development, a sight gauge shield comprises a one-piece molded polymeric member comprising: (i) first and second end portions located at opposite first and second ends; (ii) a central portion located axially between the first and second end portions; (iii) a through-bore that extends between and through the first and second opposite ends. The through-bore is defined by an inner surface. First and second sidewall portions extend axially between and interconnect the first and second opposite end portions, wherein the first and second sidewall portions are located in opposed facing relation to each other and are separated by first and second elongated, axially extending slots.

In accordance with another aspect of the present development, a liquid dispensing urn comprises a liquid dispensing faucet, a sight gauge connected to the faucet, and a sight gauge shield in which said sight gauge is received. The sight gauge shield comprises: a one-piece molded polymeric shield member that comprises: (i) first and second end portions located at opposite first and second axial ends; (ii) a central portion located axially between the first and second end portions; and, (iii) a bore that extends between the first and second opposite ends. The bore defined by an inner surface. First and second sidewall portions extend axially between and interconnect the first and second opposite end portions, wherein the first and second sidewall portions are located in opposed facing relation to each other and are separated by first and second elongated, axially extending slots.

BRIEF DESCRIPTION OF THE DRAWINGS

The development comprises various features and arrangements of features, and various steps and arrangements of steps, preferred embodiments of which are disclosed herein with reference to the accompanying drawings that form a part hereof and wherein.

DETAILED DESCRIPTION OF PREFERRED EMBODIMENTS

Figure 1:
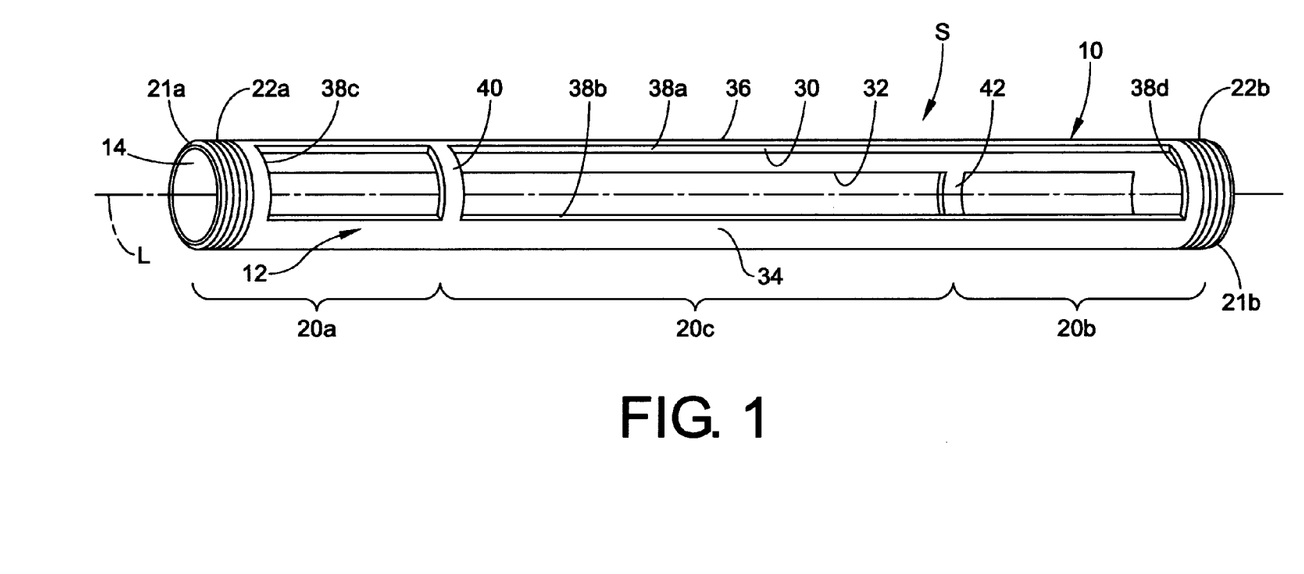
FIG. 1 is an isometric view of a sight gauge shield formed in accordance with the present development.
Figure 2:
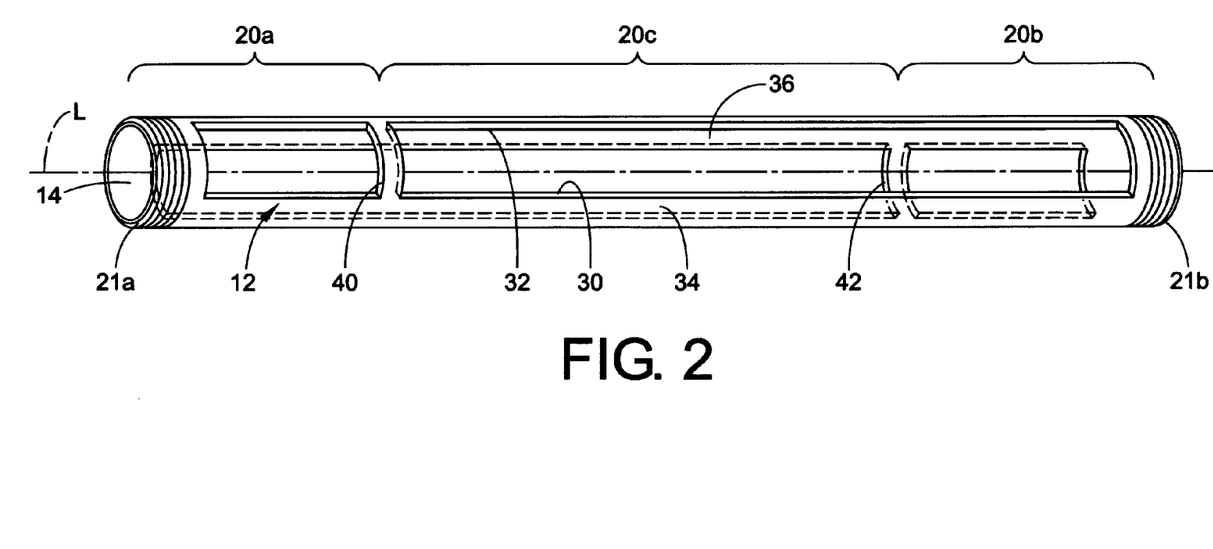
FIG. 2 is another isometric view similar to FIG. 1 but showing hidden features of the sight gauge shield in broken lines.

A sight gauge shield S formed in accordance with the present development is shown in FIGS. 1 and 2 and comprises an elongated slotted tubular member 10 that defines a cylindrical outer surface 12 and a cylindrical inner surface 14. The member 10 and the outer and inner cylindrical surfaces 12,14 extend longitudinally along and are defined about a central longitudinal axis L. The member 10 is defined as a one-piece molded (e.g., injection molded) polymeric plastic construction from any plastic material that is suitable for conventional injection molding operations such as Nylon, ABS, or the like. In the illustrated example, the member 10 has a uniform, constant wall thickness.

The member 10 defines first and second opposite ends 20a,20b and a central section 20c therebetween. A cylindrical inner surface 14 defines a preferably through-bore that extends along the axis L between and through the opposite ends 20a,20b. The ends 20a,20b define respective complete annular portions 21a,21b of the member 10 preferably including external threads 22a,22b, respectively. The annular portions 21a,21b can be purely cylindrical, polygonal, or otherwise shaped while still being "annular" as the term is used herein and without departing from the overall scope and intent of the present development.

The member 10 defines first and second elongated slots 30,32 that extend axially parallel to the axis L and that are located in diametrically opposed relation to each other. The slots 30,32 are separated from each other by first and second sidewall portions 34,36 of the member 10. As shown herein, it is preferred that the slots 30,32 be identical in size and shape.

With reference to FIG. 1 and the slot 30, it is most preferred that the slots 30,32 each be defined by parallel long sides such as 38a,38b and parallel short sides such as 38c,38d, with the long sides 38a,38b being perpendicular to the short sides 38c,38d. It is also most preferred that the slots 30,32 extend completely from the first annular end 20a to the second annular end 20b of the member 10.

Portions of the member 10 preferably define first and second webs 40,42. The first web 40 spans the first slot 30 and the second web 42 spans the second slot 32. The webs 40,42 are axially offset relative to each other as shown. In particular, it is preferred that the first web 40 be offset from an axial center of the member 10 toward the first end 20a and that the second web 42 be offset from the axial center of the member 10 toward the second end 20b. It is most preferred that the webs 40,42 be located in symmetrical but opposite locations relative to each other as shown. It should be noted that the webs 40,42 are defined as extensions of the outer and inner surfaces 12,14 of the member 10, so that the webs 40,42 are continuously defined by the cylindrical outer and inner surfaces 12,14 of the member 10. As shown, the webs 40,42 lie generally parallel to each other and also to the short sides 38c,38d of the slots 30,32. The webs 40,42 are optional and more webs, identical to those shown, can be included as described below.

Figure 3:
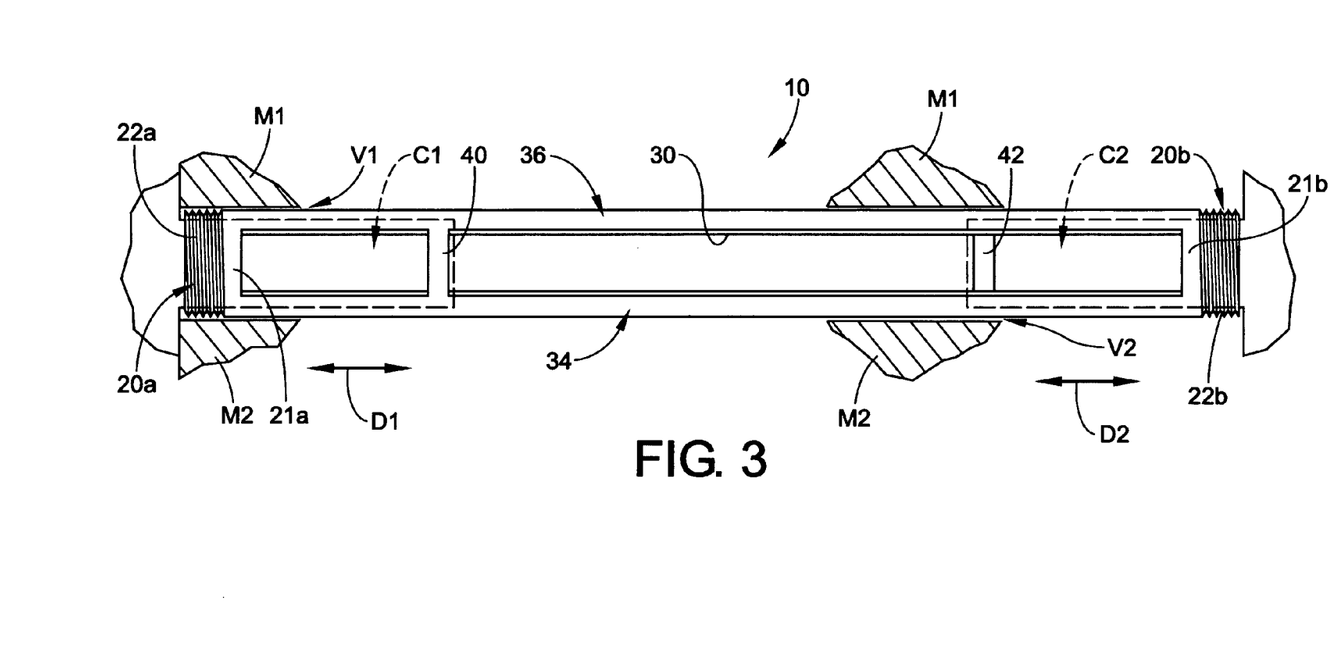
FIG. 3 is a side view of the sight gauge shield shown in FIGS. 1 and 2 and diagrammatically illustrates part of a manufacturing process in accordance with the present development.
Figures 4, 4A, 4B:
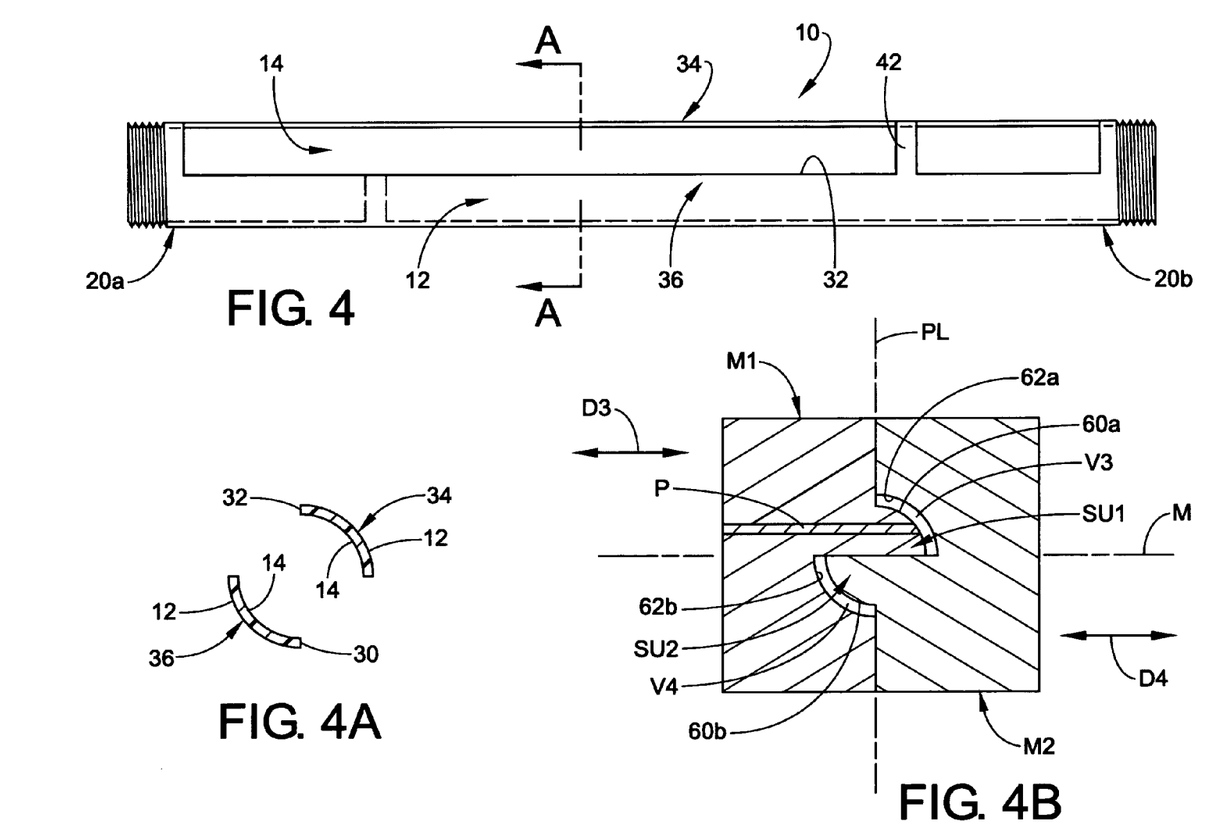
FIG. 4 is another side view of the sight gauge shield of FIGS. 1-3.
FIG. 4A is a simplified sectional view (with the background not shown for clarity) as taken along line A-A of FIG. 4.
FIG. 4B illustrates an injection molding process for defining a slotted tubular portion of the sight gauge shield in accordance with the present development.

With reference now to FIGS. 3 and 4A, the slotted tubular member 10 defining the gauge shield is injection molded in a polymeric "plastic" injection molding apparatus using first and second "straight-pull" mating mold halves or portions M1,M2 and first and second core portions C1,C2. When the mold portions M1,M2 mate (i.e., when the mold closes) and before the heated, flowable polymeric material is injected, first and second cylindrical cores C1,C2 are operatively located between to the first and second mold portions M1,M2 so that the first and second annular ends 20a,20b are molded respectively about the cores to define the cylindrical walls thereof.

With specific reference to the end 20a, the annular portion 21a with threads 22a is defined by polymeric material that fills an annular void V1 defined between the core C1 and the first and second mold portions M1,M2 (the optional external threads 22a,22b are also defined by the mold portions M1,M2). Portions of both slots 30,32 are defined where metal-on-metal contact is made between the core C1 and the mold portions M1,M2 so that no void is present to be filled by the polymeric material. Likewise, the web 40 (if present) is defined by polymeric material that fills a web-shaped void defined between the core C1 and one of the mold portions M1,M2. Because of the symmetrical structure of the member 10, the core C2 and the mold portions M1,M2 cooperate in the same (but oppositely oriented) manner so as to define an annular void V2 that is filled by the polymeric material, except where metal-on-metal contact is found between the core C2 and mold portions M1,M2, to define the annular end portion 20b and portions of the open slots 30,32 and the web 42.

The cores C1,C2 reciprocate axially toward and away from each other in a direction perpendicular to the mating movement of the first and second mold portions M1,M2 along the axis L of the member 10 being molded as shown by the arrows D1,D2, respectively, and are locked into position when the mold portions M1,M2 are mated. The cores C1 and C2 are preferably purely cylindrical (i.e., not tapered) within allowable tolerances so that the portion of internal cylindrical surface 14 of the member 10 defined thereabout is also purely cylindrical. The purely cylindrical nature of the cores C1,C2 and the need for same to mate with metal-on-metal contact with the mold portions M1,M2 to define the portions of slots 30,32 makes it preferably that the cores C1,C2 and preferably also the portions of the molds M1,M2 contacted by the cores C1,C2 be defined from a low-friction replaceable wear material such as brass-aluminum alloy or the like instead of conventional mold steel.

The member 10 has a central portion 20c located axially between (not inclusive of) the webs 40,42 and that is molded simultaneously and as a one-piece construction with the ends 20a,20b. With reference to FIGS. 4 and 4A, this central portion 20c is defined simply by the arcuate, diametrically opposed sidewall portions 34,36, and the slots 30,32 are defined circumferentially between these sidewall portions.

FIG. 4B shows how the first and second mold portions M1,M2 mate at a parting line PL by straight movement only along a single axis M so as to define the sidewall portions 34,36. More particularly, the first and second mold portions M1,M2 include respective first and second mating stand-up portions SU1,SU2 that cooperate as shown when the mold portions M1 and M2 are operatively mated. The portions SU1,SU2 define respective cylindrical arcuate outer surfaces 60a,60b about which the sidewalls 34,36 are respectively molded. The sidewall 34 is defined by polymeric material that fills an arcuate sidewall void V3 defined between the arcuate outer surface 60a of stand-up SU1 and a corresponding cylindrical inner surface 62a of the mold portion M2 when the mold portions M1,M2 mate; the sidewall 36 is defined by polymeric material that fills an arcuate sidewall void V4 defined between the arcuate surface 60b of stand-up SU2 and a corresponding cylindrical surface 62b of the mold portion M1 when the mold portions M1,M2 mate. Of course, the open slots 30,32 are defined where the stand-up portions SU1,SU2 prevent flow of polymeric material. In this manner, the sidewalls 34,36, slots 30,32 and the cylindrical outer and inner surfaces thereof 12,14 are all defined by a straight-pull mold process, i.e., the mold portions M1,M2 move only on one axis M toward and away from each other. The term "arcuate" as it applies herein is intended to encompass a circular arc-section and also any other non-planar region or surface defined by one or more curved surfaces/regions and/or interconnected planar surfaces/regions. In the illustrated embodiment, the sidewall voids V3,V4 are defined as circular arc sections. In an alternative embodiment, the arcuate sidewall voids are defined by interconnected planar void segments.

Cores C1,C2 cannot be made extend inwardly into abutment with each with commercial practicality owing to the need for these cores C1,C2 to be purely cylindrical (not tapered) and to mate with metal-on-metal contact with cylindrical portions of the mold portions M1,M2 to define portions of the slots 30,32. If the entire length of each slot 30,32 was to be formed by metal-on-metal contact between the cores C1,C2 and the mold portions M1,M2 (to prevent formations of voids for plastic flow), the friction between the cores C1,C2 and the mold portions M1,M2 would be too great and movement of the cores C1,C2 would require supplemental fluid cylinders and the like which is highly undesired. In the present, preferred arrangement, the cores C1,C2 are provided as cams that move into operative molding position in response to mating abutment of the mold portions M1,M2. Once the cores C1,C2 are operatively positioned for molding, supplemental locks are used to prevent the cores from moving during the molding operations due to the high-pressure acting thereon.

With the foregoing in mind, those of ordinary skill in the art will recognize that a slotted tubular member 10 formed in accordance with the present development is defined as a one-piece molded polymeric member via a one-time injection molding operation using a straight-pull mold arrangement having first and second mating stand-up portions SU1,SU2 and first and second cylindrical cores C1,C2. The mating stand-up portions define the central portion 20c comprising the diametrically opposed arcuate sections 34,36 separated by slots 30,32, while the end portions 20a,20b including annular portions 21a,21b are molded about the first and second cores C1,C2. All of the voids V1,V2,V3,V4 are interconnected so that the resulting molded member 10 is a one-piece member. The inner surface 14 of the member 10 is preferably purely cylindrical owing to the cylindrical cores C1,C2 and to cylindrical faces 60a,60b of the stand-up portions SU1,SU2 which are arranged and dimensioned so that the bore defined by the inner surface 14 has a constant diameter along its entire axial length.

As shown in FIG. 4B, the mold portion M1 comprises one or more ejector pins P that selectively project out of the stand-up portion SU1 to eject the resulting molded article from the mold portion M1. The pins P move axially toward the mold portion M2 and project outwardly from the surface 60a to engage the completed polymeric article on the inner surface 14 of sidewall 34 which is highly desirable because any marks left in the member 10 by the ejector pins P are hidden.

Figure 5:
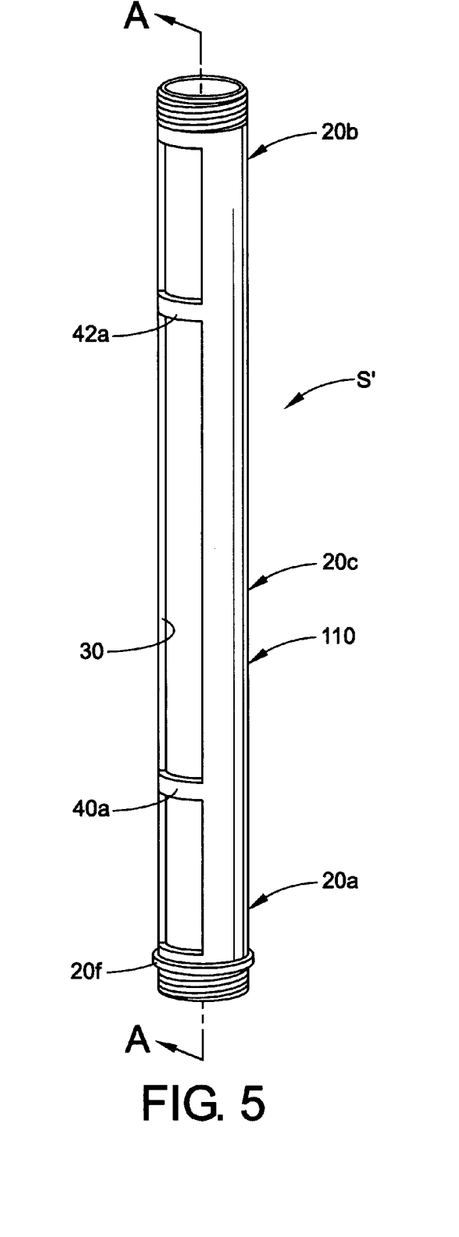
FIG. 5 is an isometric view of an alternative sight gauge shield formed in accordance with the present development.
Figure 5A:
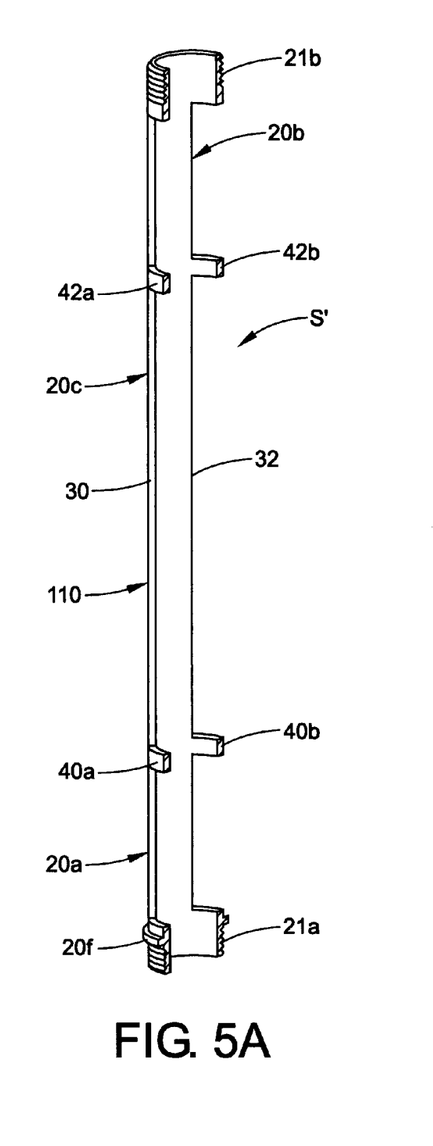
FIG. 5A is a sectional view as taken along line A-A of FIG. 5.

FIGS. 5 and 5A illustrate another sight gauge S' that comprises a slotted tubular member 110 that is identical to the member 10, except that the end 20a comprises first and second diametrically opposed webs 40a,40b that span the slots 30,32, respectively, instead of only a single web 40. Likewise, the second end 20b comprises first and second diametrically opposed webs 42a,42b that span the slots 30,32, respectively, instead of only a single web 42. The webs 40a,40b are molded about the core C1 (FIG. 3) with the remainder of the first end 20a, and the webs 42a,42b are molded about the core C2 (FIG. 3) with the remainder of the second end 20b. The member 110 also comprises a central section 20c that is identical to the central section 20c of the member 10 and that is manufactured in an identical manner as shown in FIG. 4B and described above. The end 20a comprises a radial flange 20f that is also molded about the core C1 in a void defined by the mold portions M1,M2.

Figure 6:
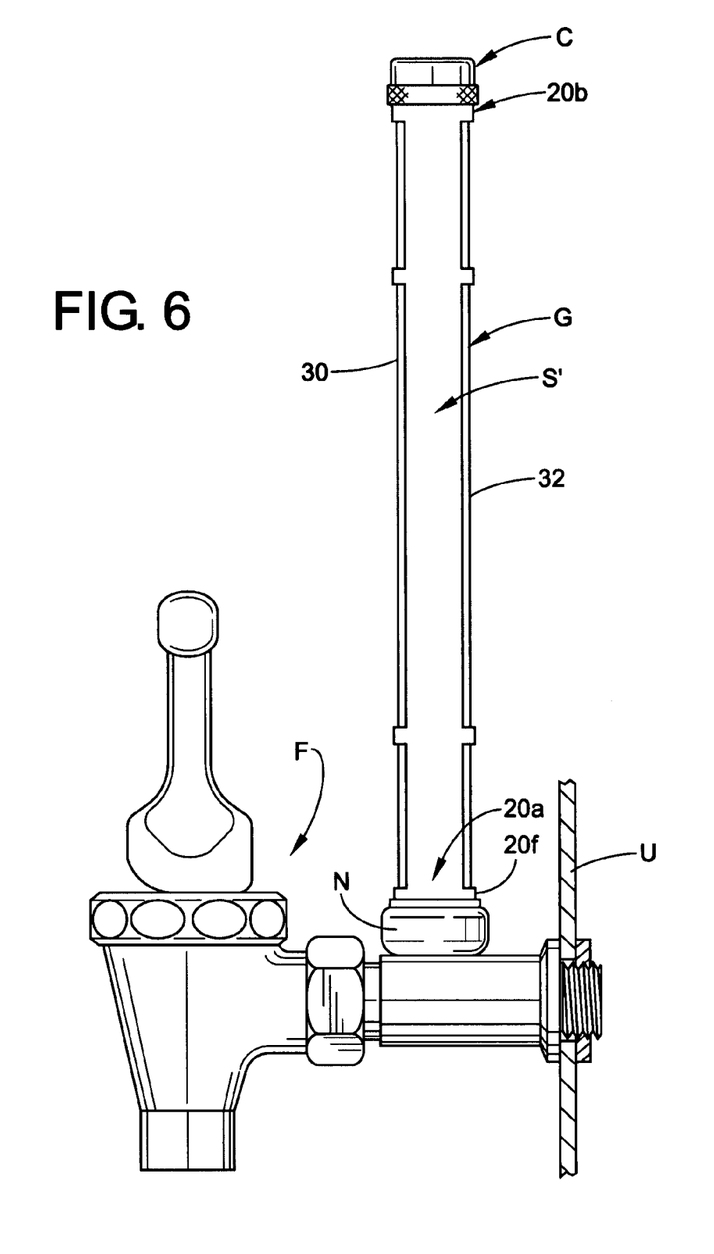
FIG. 6 shows a liquid dispensing faucet with a sight gauge assembly comprising a sight gauge shield formed in accordance with the present development.

FIG. 6 illustrates an urn U and faucet F connected thereto for dispensing liquid. The sight gauge shield S,S' can be employed as shown to protect a tubular glass or polymeric sight gauge G. More particularly, the faucet F comprises a nipple N and the sight gauge G is mated therewith so as to be in fluid-communication with the interior of urn U. The sight gauge G is closely received within the through-bore defined by inner surface 14 of the slotted shield member 10. As such, it is preferred that the gauge and bore both be cylindrical. The threads 22a of first end 20a of the slotted shield member S' are mated with the nipple N, and a cap C is threadably secured to threads 22b at second end 20b of the shield S'. The elongated open slots 30,32 allow a user to view the contents of the gauge G.

It is noted that the mold portions M1,M2, cores C1,C2 are shown diagrammatically only for clarity. Of course, the spaces between mating portions and the like are exaggerated to allow for understanding the present development.

The development has been described with reference to preferred embodiments. Modifications and alterations will occur to those of ordinary skill in the art, and it is intended that the following claims be construed as broadly as possible to encompass all such modifications and alterations.

The invention claimed is:

1. A method for manufacturing a sight gauge shield, said method comprising:
    mating first and second mold portions about first and second spaced-apart cores to define: (i) a first annular void between said first core and said first and second mold portions; and, (ii) a second annular void between said second core and said first and second mold portions, wherein said first and second mold portions respectively comprise first and second stand-up portions, and wherein said first stand-up portion cooperates with said second mold portion to define a first sidewall void and wherein said second stand-up portion cooperates with said first mold portion to define a second sidewall void;
    molding opposite first and second annular end portions of a gauge shield member by filling said first and second annular voids with a polymeric material; and,
    molding first and second sidewalls of said gauge shield member as a one-piece construction with said first and second annular end portions by filling said first and second sidewall voids with said polymeric material.

2. The method as set forth in claim 1, wherein said first and second cores are cylindrical.

3. The method as set forth in claim 2, further comprising:
    contacting said first core with at least one of said first and second mold portions at a first metal-on-metal contact zone to prevent said polymeric material from flowing into said first metal-on-metal contact zone; and,
    contacting said second core with at least one of said first and second mold portions at a second metal-on-metal contact zone to prevent said polymeric material from flowing into said first metal-on-metal contact zone.

4. The method as set forth in claim 1, wherein said first and second sidewall voids comprise respective first and second circular arc segment void portions.

5. The method as set forth in claim 4, wherein:
    said first sidewall void Is defined at least partially between an arcuate outer surface of said first stand-up portion and an arcuate inner surface of said second mold portion; and,
    said second sidewall void is defined at least partially between an arcuate outer surface of said second stand-up portion and an arcuate inner surface of said first mold portion.

6. The method as set forth in claim 5, wherein said arcuate outer surfaces of said first and second stand-up portions and said arcuate inner surfaces of said first and second mold portions between which said first and second sidewall voids are each defined as a circular arc segment.

7. The method as set forth in claim 6, wherein said first and second sidewall voids are arranged in opposed facing relation.

8. The method as set forth in claim 7, wherein said first and second sidewall voids are arranged in diametrically opposed facing relation.

9. The method as set forth in claim 8, further comprising:
separating said first and second mold portions; and,
extending at least one ejector pin from said first mold portion to eject said polymeric material from said first mold portion.

10. The method as set forth in claim 9, wherein said at least one ejector pin engages said polymeric material on in inner surface thereof that defines a through bore.

11. A sight gauge shield constructed according to the method of claim 8.

* * * * *